(12) United States Patent
Fujisaki et al.

(10) Patent No.: US 7,425,260 B2
(45) Date of Patent: Sep. 16, 2008

(54) SEPARATION PASSAGEWAY MODULE, SEPARATION UNIT, AND SEPARATION BOAT FOR SUSPENSION SEPARATION

(75) Inventors: Kazuhiro Fujisaki, Hinosato 1-22-12, Munakata, Fukuoka (JP) 811-3425; Kuo-Lun Tung, Chung-Li (TW)

(73) Assignees: Kazuhiro Fujisaki, Fukuoda (JP); Chung Yuan Christian Univers, Chung-Li (TW)

( * ) Notice: Subject to any disclaimer, the term of this patent is extended or adjusted under 35 U.S.C. 154(b) by 0 days.

(21) Appl. No.: 11/458,674

(22) Filed: Jul. 19, 2006

(65) Prior Publication Data
US 2007/0017863 A1     Jan. 25, 2007

(30) Foreign Application Priority Data
Jul. 21, 2005     (JP) ............................ 2005-211776

(51) Int. Cl.
*B01D 21/02* (2006.01)
(52) U.S. Cl. ...................... 210/122; 210/522; 210/540; 210/242.1
(58) Field of Classification Search .............. 210/242.1, 210/122, 521, 522, 540
See application file for complete search history.

(56) References Cited

U.S. PATENT DOCUMENTS 3,613,889 A * 10/1971 Reed .......................... 210/522
4,305,819 A * 12/1981 Kobozev et al. ............. 210/521
4,346,005 A *  8/1982 Zimmerman ................ 210/521
5,584,993 A * 12/1996 Van Der Schrieck ....... 210/242.1
6,004,456 A * 12/1999 Khudenko ................... 210/122
2005/0000893 A1 *  1/2005 Boulant ....................... 210/522

FOREIGN PATENT DOCUMENTS

JP          2005-169380       *  6/2005

* cited by examiner

*Primary Examiner*—Christopher Upton
(74) *Attorney, Agent, or Firm*—WPAT., P.C.; Justin King

(57) ABSTRACT

The present invention discloses a separation passageway module comprising a plurality of inclined plates, at least one suction pipe, and a buoyancy regulator. The inclined plate passageways are comprised by a plurality of inclined parallel plates. The inclined plate passageways have an opening at either the lower end or the upper end. In the case of having an opening at the lower end, suspension flows into the passageways from the lower end to carry out settling separation and to thereby generate clear liquid at the upper end of the inclined plate passageways. On the other hand, in the case of having an opening at the upper end, suspension flows into the passageways from the upper end to carry out floating separation and to thereby generate clear liquid at the lower end of the inclined plate passageways. One end of the suction pipe is connected to the upper end or lower end of the inclined plate passageways for drawing the clear liquid. The buoyancy regulator adjusts the buoyant force of the separation passageway module so as to make the buoyant force and the gravity of the separation passageway module reach a specific relationship. Furthermore, the present invention discloses the structures of a suspension separation unit and a suspension separation boat.

21 Claims, 14 Drawing Sheets

(a)　　　　　(b)

(a)

(b)

(a)            (b)

(a)

(b)

(a)

(b)

(a)

(b)

(a)

(b)

SEPARATION PASSAGEWAY MODULE, SEPARATION UNIT, AND SEPARATION BOAT FOR SUSPENSION SEPARATION

BACKGROUND OF THE INVENTION

1. Field of the Invention

The present invention is generally related to a separation apparatus, and more particularly to a separation passageway module, a separation unit, and a separation boat for suspension separation.

2. Description of the Prior Art

Usually, an inclined settling separation apparatus is used in water purifying plants or drainage treatment plants. The inclined settling separation apparatus sets in a suspension separation tank filled with suspension to form separation passageways and to draw out clear liquid generated at the lower part of the inclined plates. Many inclined plates are provided at the bottom and the more the total area of the inclined plates, the faster the generating speed of the clear liquid. Therefore, treatment ability to the separation tank can be increased. Thus, even suspended particles with very slow precipitation speed can be separated.

Japanese published patent application No. 2005-169380 discloses a suspension separation apparatus comprising a plurality of slanted separation passageways three-dimensionally arranged in a suspension separation tank to enhance treatment ability. In addition, it is very easy to exchange the separation passageways. Thus, the separation passageways can be under maintenance or repair while the apparatus is in operation. On the other hand, the quantity of the separation passageways in the suspension separation tank can be increased or decreased, depending on the amount of the suspension, so as to have flexibility in treatment ability.

However, in designing the practical dimension for the separation passageway module, the mass of the module becomes very large. For example, stainless steel plates are used to make the main body of the module with a dimension of 1 m×1 m×2 m and the mass of the module will be about 100~240 kgs. In the case of having large mass, if the separation passageway module drops into the suspension separation tank due to malfunction in installation or operation, the separation passageway module or the suspension separation tank may be damaged. Besides, equipments, such as the scraper provided at the bottom of the suspension separation tank for collecting sludge, may also be damaged. Therefore, in order to prevent the separation passageway module from dropping off, additional supporting objects are needed to secure the structural safety. However, if the supporting objects become clumsy and bulky, the module cannot be conveniently utilized and the cost is also increased.

In addition, in order to support the separation passageway module with large mass in the suspension separation tank, large supporting objects will be needed.

Specifically, as shown in FIG. 15, a truss girder 53 is required to be provided across two ends of a suspension separation tank 38 and separation passageway modules 54 are hung by a rope 55. Supporting objects, like the truss girder 53, take a lot of space. Thus, the quantity of the modules that can be provided in the suspension separation tank is restricted. Therefore, the quantity of the separation passageway modules 54 provided in the suspension separation tank 38 is also restricted.

On the other hand, if equipments, like scraper, for collecting settling flocculation are provided at the bottom of the suspension separation tank 38, the scraper will be damaged while the rope 55 is broken, the separation passageway modules 54 drop off or sink, collision between the separation passageway modules 54 and the scraper happens.

Besides, it is very difficult to retrieve and recover the separation passageway modules if dropping into the suspension separation tank while installation or maintenance. That is to say, transparency of the suspension in the suspension separation tank is very low. Thus, if the depth of the tank is very deep, the suspension in the tank has to be drained in order to find the drop-off separation passageway module. If the module is very heavy, salvage operation is very difficult. In light of the above-described matter, light-weighted supporting objects with simple structure are required to mount the separation passageway module at the specific position in the suspension separation tank and also to prevent the module from dropping into the tank. Or, a separation passageway module and a separation unit that do not damaged the equipments at the bottom while dropping into the tank are required to meet the requirements of the industry.

SUMMARY OF THE INVENTION

In view of the above mentioned background, a new separation passageway module, a separation unit, and a separation boat for suspension separation are provided to conquer the above-described disadvantages of the prior art.

One object of the present invention is to provide light-weighted supporting objects with simple structure to mount the separation passageway module at the specific position in the suspension separation tank and a separation passageway module that will not damage the equipments at the bottom even when the separation passageway module drops into the bottom of the suspension separation tank.

Another object of the present invention is to adjust the relationship between the buoyant force and the gravity of the separation passageway module by a buoyancy regulator in the separation passageway module. In addition, it is very easy to install and operate the buoyancy regulator. High speed settling and agglutination apparatus cooperated with the operating principle of inclined plates can increase the processing efficiency of a settling tank up to several times. Besides, when continuously operated by siphon phenomena, man power and motive power are not needed as long as the apparatus is fixed in the settling tank by cables or ropes. The present invention increases the processing capability of the settling tank in the water supply and sewage treatment applications, avoids the situation of high suspension loading in the combined sewerage system at a sewage treatment plant while raining, and removes high speed settling of suspension at construction sites or flooding sites. Therefore, the invention has economic benefit and industrial usability.

Accordingly, the present invention discloses a separation passageway module comprising a plurality of inclined plates, at least one suction pipe, and a buoyancy regulator. The inclined plate passageways are comprised by a plurality of inclined parallel plates. The inclined plate passageways have an opening at either the lower end or the upper end. In the case of having an opening at the lower end, suspension flows into the inclined plate passageways from the lower end to carry out settling separation and to thereby generate clear liquid at the upper end of the inclined plate passageways. On the other hand, in the case of having an opening at the upper end, suspension flows into the inclined plate passageways from the upper end to carry out floating separation and to thereby generate clear liquid at the lower end of the inclined plate passageways. One end of the suction pipe is connected to the upper end or lower end of the inclined plate passageways for drawing the clear liquid. The buoyancy regulator adjusts the buoyant force of the separation passageway module so as to make the buoyant force and the gravity of the separation passageway module reach a specific relationship. On the other hand, the present invention discloses the structures of a suspension separation unit and a suspension separation boat.

DESCRIPTION OF THE PREFERRED EMBODIMENTS

What is probed into the invention is a separation passageway module, a separation unit, and a separation boat for suspension separation. Detail descriptions of the structure and elements will be provided in the following in order to make the invention thoroughly understood. Obviously, the application of the invention is not confined to specific details familiar to those who are skilled in the art. On the other hand, the common compositions or steps that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Referring to Japanese published patent application No. 2005-169380, a suspension separation apparatus, comprising a plurality of slanted passageways three-dimensionally arranged vertically or horizontally in a suspension separation tank, is disclosed.

Figure 12:
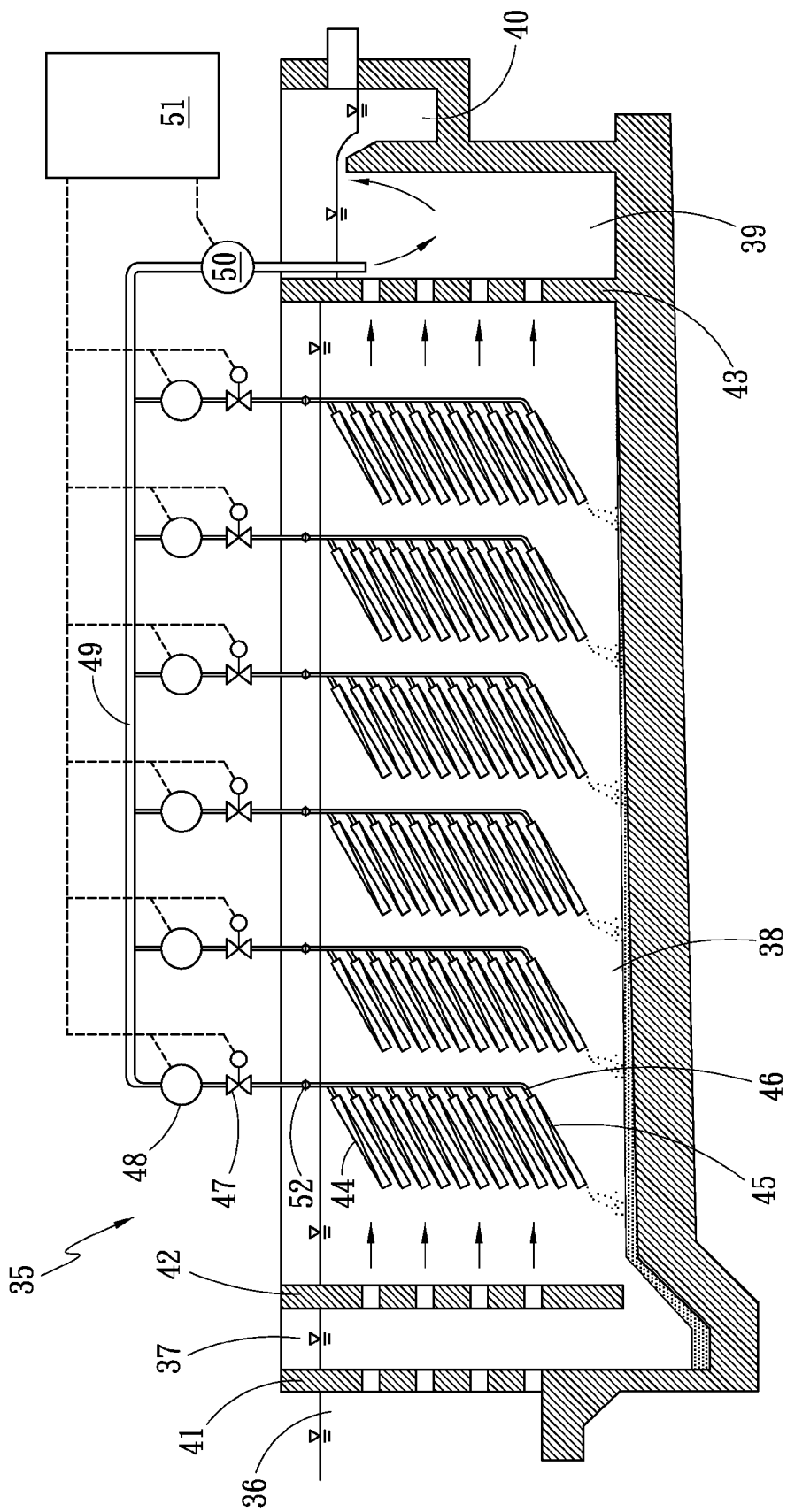
FIG. 12 is the whole structure diagram of the suspension separation apparatus according to the prior art.
Figure 13:
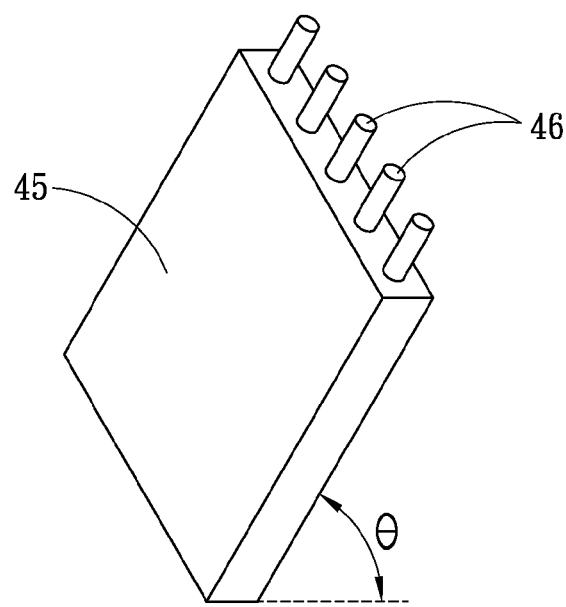
FIG. 13 is an oblique view of the slanted pipe according to the prior art.
Figure 13:
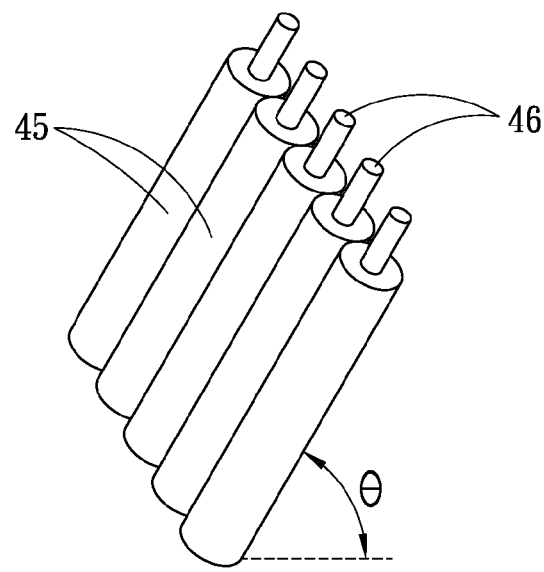

FIG. 12 is a horizontal sectional view of the separation passageway module disclosed in Japanese published patent application No. 2005-169380. As shown in FIG. 13, from the upstream side of water flow, the suspension separation apparatus 35 comprises a flocculation forming tank 36, an inflow tank 37, a suspension separation tank 38, an outflow tank 39, and liquid drainage channel 40.

The flocculation forming tank 36 is a water tank with mixing apparatus (slow stirring apparatus) (not shown) for placing coagulant into the inflow suspension. The water tank makes the suspended substance in the suspension coagulate to form flocculation.

The suspension from the flocculation forming tank 36 flows into the inflow tank 37 in which settling and removal of the flocculation with large particle diameters are carried out and the flow of the suspension is also absorbed.

The suspension from the inflow tank 37 flows into the suspension separation tank 38 in which settling and removal of the rest of the flocculation are carried out and clear water is generated.

The outflow tank 39 temporarily stores the clear water flowing from the suspension separation tank 38. The clear water stored in the outflow tank 39 flows to next processing station via the liquid drainage channel 40.

A front flow regulation wall 41 is provided between the flocculation forming tank 36 and the inflow tank 37 while a rear flow regulation wall 42 is provided between inflow tank 37 and the suspension separation tank 38. In addition, an outflow side flow regulation wall 43 is provided between the suspension separation tank 38 and the outflow tank 39. These flow regulation walls are for regulating the flow of the suspension to prevent water flow due to density differences (Water flows from high density location to low density location.).

A plurality of slanted passageways 44 are provided inside the suspension separation tank 38. The slanted passageway 44 is an assembly of slanted pipes 45 arranged vertically. The slanted pipe 45 has an open lower end and is provided slanted with an angle of 60°.

The upper end of the slanted pipe 45 is connected to a suction pipe 46. The suction pipes 46 comprise a trunk pipe provided at each slanted passageway 44 and branched pipes connected to the slanted pipes 45 and branching from the trunk pipe. All of the suction pipes 46 pass through a flow regulating valve 47 and a turbidimeter 48 and are connected altogether with a main suction pipe 49. In addition, the downstream of the main suction pipe 49 is provided with a suction pump 50 and the downstream end of the main suction pipe 49 is open to the outflow tank 39.

The flocculation in the suspension flowing from the lower end of the slant pipes 45 passes through the slanted pipes 45 and thus settles at the bottom of the slanted pipes 45 to thereby be discharged from the lower part of the slant pipes 45. At the same time, clear water is generated at the upper end of the slant pipe 45. The generated clear water passes through the suction pipe 46 and flows into the outflow tank 39. Thus, the slanted passageway 44 has the function of a separation passageway assembly, i.e. the function of separation passageway module.

A control panel 51 is provided in the suspension separation apparatus 35 and controls opening of each flow regulating valve 47 and power of the suction pump 50 based on the turbidity measured by each turbidimeter 48.

A junction device 52 is provided at the lower part (downstream side) of the flow regulating valve 47 of the suction pipe 46. By separating or joining the junction device 52, the slanted passageway 44 can be installed or uninstalled from the suspension separation tank 38.

FIG. 13 is an oblique view of the slanted pipe 45. The slanted pipe 45 can has a flat rectangular solid box shape, as shown in FIG. 13(a) or a thin long tubular shape, as shown in FIG. 13(b). If the thin long tubular shape is used as the slanted pipe 45, a plurality of slanted pipes 45 should be arranged horizontally, as shown in FIG. 13. The slanted pipe 45 is provided slanted in angle θ with respect to the horizontal plane inside the suspension separation tank 38. The angle θ has to be greater than the resting angle for piling up settling flocculation because the flocculation settling in the slanted pipe 45 has to be discharged from the lower end of the slanted pipe 45. Generally, the angle θ is set to be an angle larger than 60°.

Figure 14:
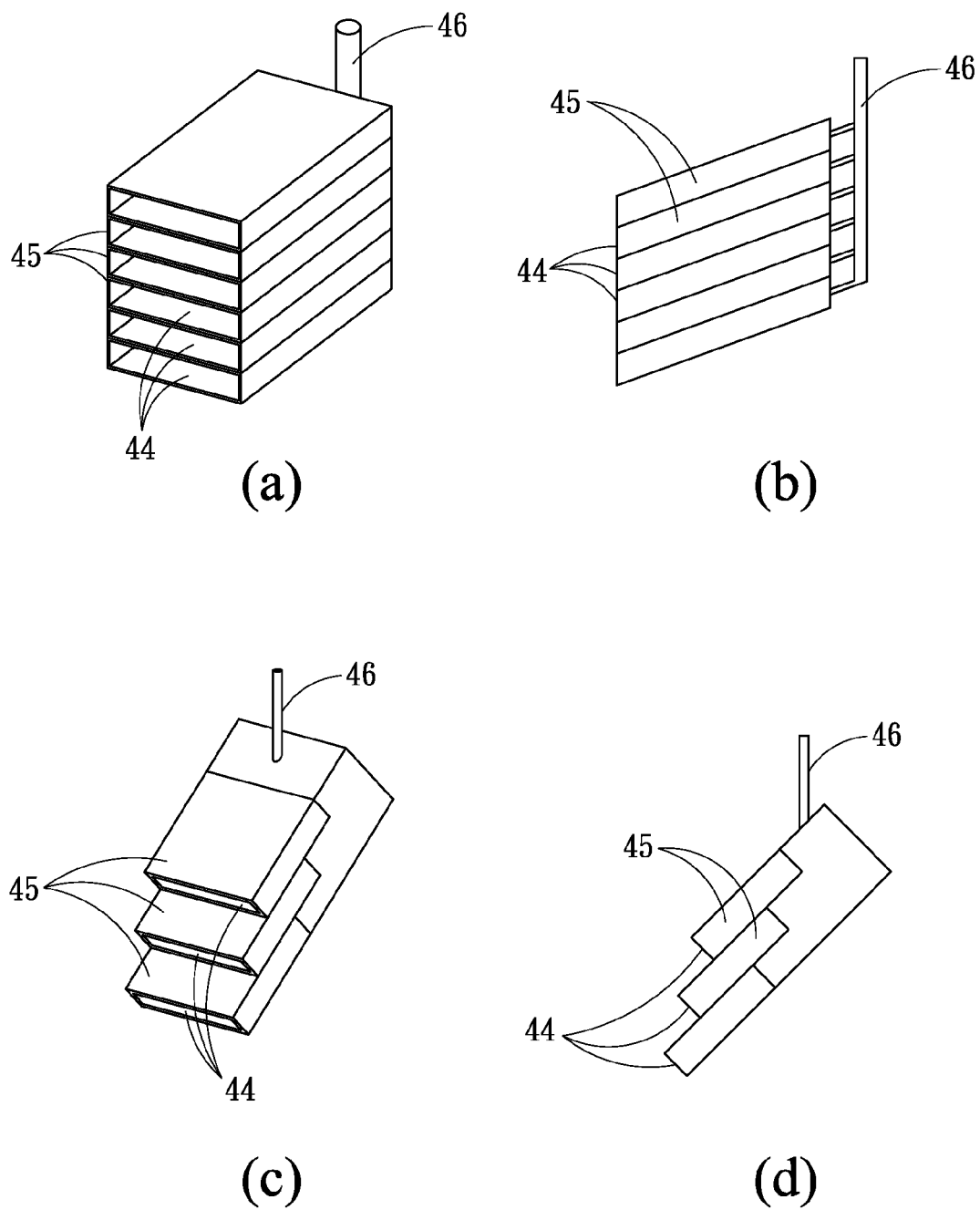
FIG. 14 is an oblique view of the slanted passageway according to the prior art.
Figure 15:
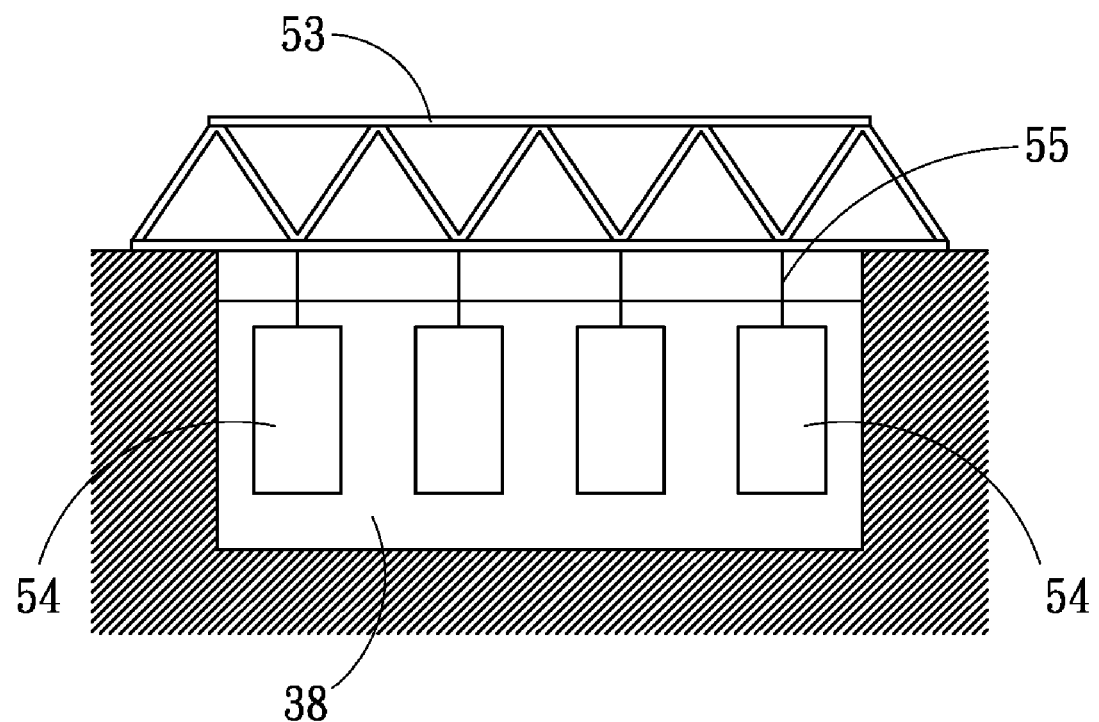
FIG. 15 is a schematic diagram illustrating the state of the separation passageway module according to the prior art being provided at the bottom of suspension separation tank.

FIG. 14 is an oblique view of the slanted passageway 44. FIG. 14(b) is a side view of the slanted passageway 44 in FIG. 14(a) while FIG. 14(d) is a side view of the slanted passageway 44 in FIG. 14(c). The slanted passageway 44 is formed by providing a plurality slanted pipes 45 without any gap in between. Thus, space is not wasted and the apparatus becomes more compact.

The first structure of the separation passageway module according to the present invention is different from the style of the suspension separation tank and comprises a plurality of inclined plate passageways in the module for settling or floating separation. Each inclined plate passageway has one end connected to a suction pipe that can draw and drain clear liquid generated in the inclined passageway. The separation passageway module comprises a buoyancy regulator for adjusting the buoyant force generated by the separation passageway module.

Based on the structure, in the suspension, the buoyant force generated by the buoyancy regulator counterbalances the weight of the separation passageway module. Therefore, the loading for the supporting objects that mount the separation passageway module at the determined position in the suspension separation tank can be reduced. Thus, the supporting object can have a simple, small, light-weighted structure. For example, the separation passageway module floats on the liquid level or in the liquid of the suspension separation tank and can be tied by wire ropes only.

Besides, if the supporting objects have simple and compact structures, the interval between the separation passageway modules can be reduced. Therefore, the separation passageway modules can be provided in the suspension separation tank with high density. It is thus easy to increase the processing efficiency for suspension separation. Even though the supporting object is broken to let the separation passageway module collide the bottom of the suspension separation tank, the impact to the bottom of the suspension separation tank is small. Thus, damaging the apparatus becomes less dangerous. The buoyancy regulator adjusts the buoyant force to appropriate amount so as to let the separation passageway module float in the suspension separation tank. Thus, the separation passageway module will not drop to the bottom of the suspension separation tank, even when the supporting object is broken.

Therefore, for settling separation of suspension, the inclined passageway has a structure of the inclined lower end as the liquid inlet and the inclined upper end connected to a suction pipe while for floating separation of suspension the inclined passageway has a structure of the inclined upper end as the liquid inlet and the inclined lower end connected to a suction pipe. The inclined passageway generally has an inclined pipe shape with an opening at the lower end or upper end.

The suspension described in the invention can be any type of liquid and any type of suspended substance as long as suspended substance remains suspended in a liquid under stilling state, such as cloudy water or oil water mixture solution. The buoyancy regulator can be made of any material and any shape as long as it is an object capable of keeping out water to generate buoyant force, such as a solid like foaming resin chunk or a hollow container like tank or floating bag.

According to the invention, the module comprises a casing for accommodating each inclined passageway and the side face of the casing has an opening as the liquid inlet for each inclined passageway. The empty portion of the interior of the casing can be used as the buoyancy regulator.

The second structure of the separation passageway module according to the present invention has the following characteristics, i.e. the buoyancy regulator in the first structure is provided on the top of the inclined passageway. Based on the structure, because the buoyancy regulator is provided on the top of the inclined passageway, set in the suspension separation tank, the center of buoyant force of the module is higher than the center of gravity of the module and thus the module can be maintained steadily without falling.

The third structure of the separation passageway module according to the present invention has the following characteristics, i.e. the above described buoyancy regulator comprises a gas container that is formed by a gasbag for inhaling, expelling, and accommodating air, a hollow hose, or a hollow pipe and has the function of inhaling and expelling air for the gas container.

Based on the structure, the volume of the gas container is changed by expelling air from the gas container and injecting air into the gas container so as to let the separation passageway module float up or down. Therefore, it is very easy to install and uninstall the separation passageway module. In addition, the weight of the gas container is very light and thus the center-of-gravity position is lowered so as to maintain the separation passageway module at a stable state.

The fourth structure of the separation passageway module according to the present invention has the following characteristics, i.e. the buoyancy regulator in the first and second structures comprises a ballast tank where the suspension in the suspension separation tank can be injected or drained and a liquid injecting/draining means for carrying out suspension injection or drainage to the ballast tank. Based on the structure, by injecting or draining liquid from the ballast tank, the separation passageway module can be controlled to float up or down.

The fifth structure of the separation passageway module according to the present invention has the following characteristics, i.e. the liquid injecting/draining means in the fourth structure comprises a liquid injection/drainage opening at the bottom of the ballast tank, a gas inhaling/expelling opening on the top of the ballast tank, and a gas valve for opening or closing the gas inhaling/expelling opening. Based on the structure, suspension passes through the liquid injection/drainage opening into the ballast tank while the gas valve is open to let the inhaling/expelling gas pipe open to air. The flow of suspension is stopped while the gas valve is close. Furthermore, if the inhaling/expelling gas pipe is connected to a high pressure air source, high pressure air is led into the ballast tank so as to drain the suspension in the ballast tank via the liquid injection/drainage opening. The high pressure air source can be a high pressure gas tank or a portable air compressor.

The sixth structure of the separation passageway module according to the present invention has the following characteristics, i.e. the module in any of the structures from the first one to the fifth one comprises buoyancy balance regulators at least at two different locations for independently adjusting the buoyant force. Based on the structure, the state of the separation passageway module can be freely adjusted. The buoyancy balance regulator can be made of any material or any form as long as it is a floating body that can adjusts buoyant force. For example, it can be a ballast tank capable of freely injecting/draining liquid, a container, the volume of which is variable, or a gasbag capable of freely inhaling/expelling gas.

The seventh structure of the separation passageway module according to the present invention has the following characteristics, i.e. a pair of the buoyancy balance regulators in the sixth structure is provided at the left and right hand sides of the module. Based on the structure, the left and right tilting angles of the separation passageway module can be adjusted because the buoyancy balance regulators are provided at the left and right hand sides of the module.

The eighth structure of the separation passageway module according to the present invention has the following characteristics, i.e. each buoyancy balance regulator in the sixth structure is provided at the opening side of the inclined passageway of the module and the inclined passageway is connected to one side of the suction pipe. Based on the structure, the separation passageway module can be shaken to the front or the rear so as to discharge flocculation piling up in the separation passageway because the buoyancy balance regulator are provided at the opening side of the inclined passageway of the module and the inclined passageway is connected to one side of the suction pipe.

The ninth structure of the separation passageway module according to the present invention has the following characteristics, i.e. the module in any of the structures from the first one to the eighth one comprises a staff for measuring setup depth of the module. Based on the structure, by measuring the height of the staff above the liquid level, the depth of the installation position of the separation passageway module is known. Moreover, by arranging the staff from the front to the rear or from the left to the right, the tilting of the separation passageway module can be known.

The suspension separation unit according to the present invention has the following characteristics, i.e. the structure comprises a conduit floating on the liquid level of the suspension separation tank (The conduit can be a self-contained structure, such as one piece formed tubular object or a capped tubular object, or an upper opening structure, such as trench structure.); separation passageway modules comprising a plurality of inclined passageways mounted on the conduit for carrying out settling or floating separation to the suspension in its own body; and, a suction pipe, one end of which is connected to one end of the inclined passageway for drawing clear liquid into a drainage channel and the other end of which is connected to the drainage channel.

Based on the structure, the suspension separation unit floats on the fluid level of the suspension separation tank by the buoyant force generated by a floating container. Thus, heavy objects are unnecessary in the suspension separation tank to support the separation unit. Therefore, the suspension separation unit can be easily installed in an existing suspension separation tank.

The suspension separation boat according to the present invention has the following characteristics, i.e. the boat comprises a liquid inlet provided below the waterline of the boat at the lower shipboard; an inclined passageway provided in the boat to carry out settling separation for suspension flowing from the inlets to generate clear liquid; a storage tank for storing the clear liquid generated by the inclined passageway.

Based on the structure, in the area requiring clear water, such as the adversity area where the water supply equipment is damaged, the separation boat sailing or towed supplies clear water from river water as raw material for water treatment.

According to the above, based on the present invention, the separation passageway module or the suspension separation unit is supported by buoyant force. Therefore, when these equipments are installed in the suspension separation tank, large-scale supporting objects are not required to support these equipments. Thus, when suspension separation apparatus is installed to increase the processing efficiency for the existing suspension separation tank, installation work becomes simple. Furthermore, the suspension separation boat comprising suspension separation modules floats/sails so as to easily install an emergent water treatment plant at the diversity area.

Referring to figures, the preferred embodiments according to the present invention will be described in the following.

EXAMPLE 1

Figure 1:
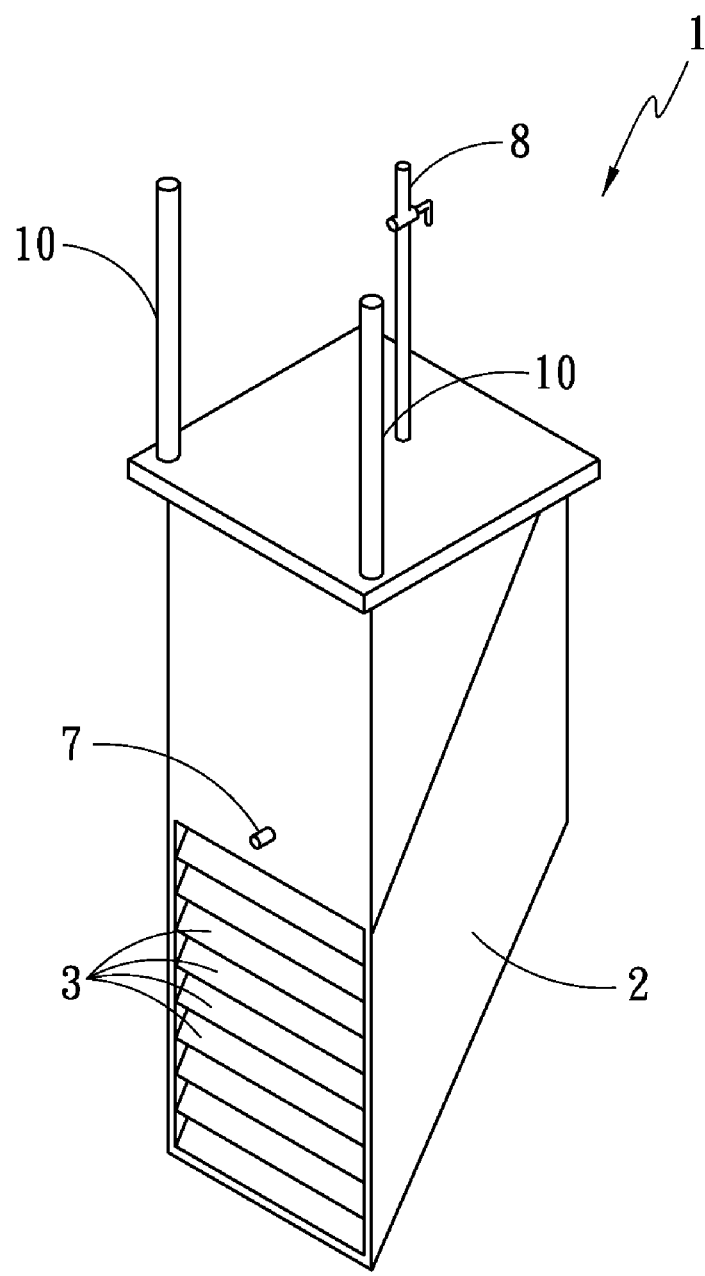
FIG. 1 is an oblique view of the separation passageway apparatus according to example 1 of the present invention.
Figure 2:
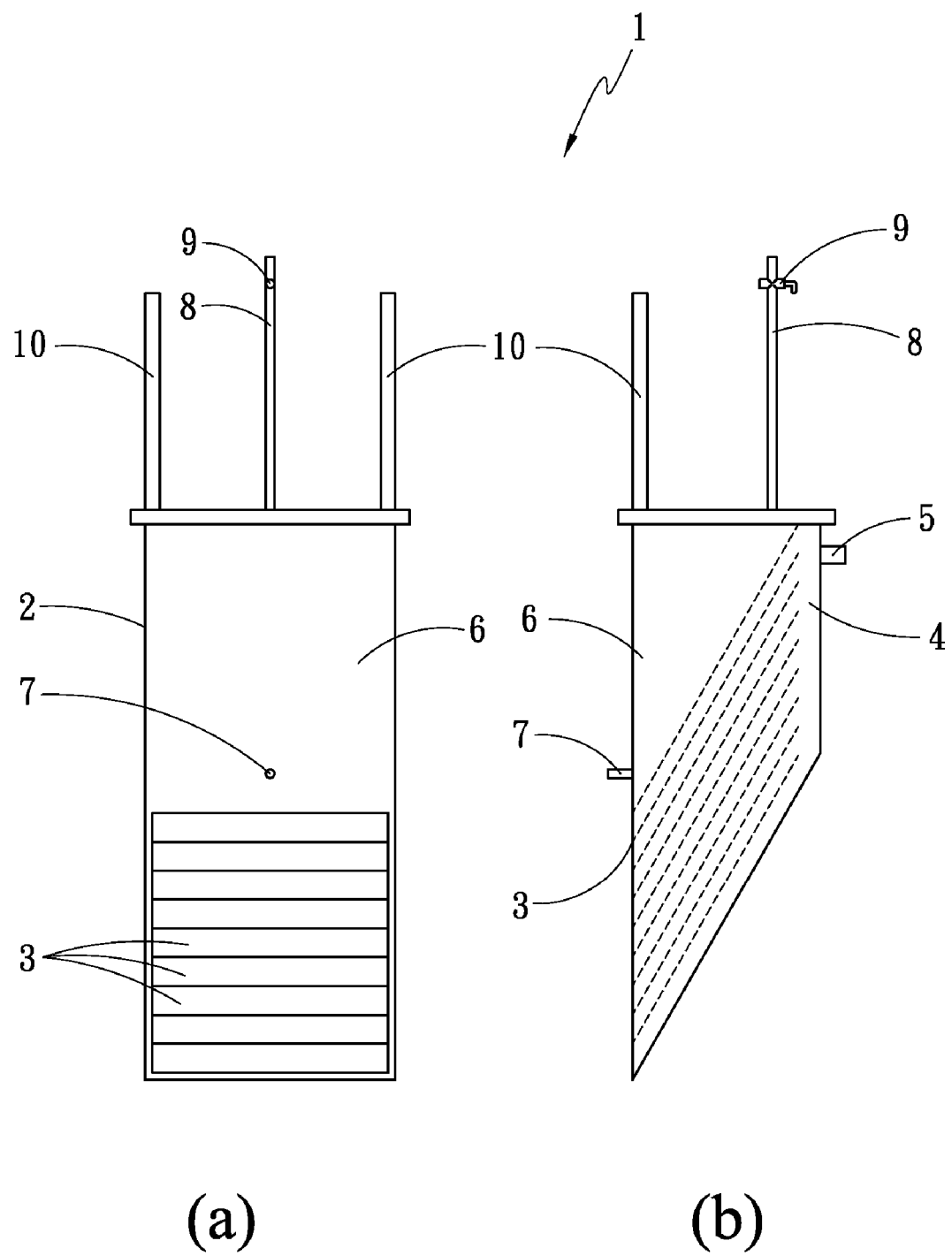
FIG. 2 is a front view and a side view of the separation passageway apparatus according to example 1 of the present invention.

FIG. 1 is an oblique view of the separation passageway apparatus according to example 1 of the present invention while FIG. 2 is a front view and a side view of the separation passageway apparatus. As shown in FIGS. 1 and 2, the separation passageway apparatus 1 comprises a casing 2, a plurality of inclined plates 3, a storage region 4 for storing clear liquid, a suction pipe 5, and a buoyancy regulator 6. The casing 2 comprises a top plate, a bottom plate, two front and rear side plates, and two parallel left and right side plates wherein the front side plate is perpendicular to the left and right side plates and the lower end of the front side plate has an opening region as an inlet for suspension. The inclined plates 3 are parallel to each other and provided low in the front and high in the rear between the left and right side plates wherein the front end of the inclined plates 3 is connected to the opening region to guide suspension to flow in and carry out settling separation so as to generate clear liquid at the rear end of the inclined plates. The storage region 4 is provided at the rear end of the inclined plates 3 and between the left and right side plates and the rear side plate. Besides, one end of the suction pipe 5 is connected to the storage region 4 for drawing out the clear liquid.

The buoyancy regulator 6 is provided between the top plate, the front said plate, the left and right side plates, and the inclined plate that is closest to the top plate wherein the buoyancy regulator 6 adjusts buoyant force of the separation passageway apparatus so as to make buoyant force and gravity of the separation passageway apparatus have a specific relationship. A water injection/drainage pipe 7 is provided under the buoyancy regulator 6 while a gas inhaling/expelling pipe 8 is provided on the top of the buoyancy regulator 6. A gas inhaling/expelling valve 9 is provided on the gas inhaling/expelling pipe 8. Two depth measuring staffs 10 are provided on the top of the casing 2 and arranged left and right side by side.

The water injection/drainage pipe 7 connects the interior and exterior of the buoyancy regulator 6. Water flows in and out via the water injection/drainage pipe 7. As long as water can flow in and out the buoyancy regulator 6, the length, diameter, and quantity of the water injection/drainage pipe 7 are not restricted. In addition, the lower portion of the buoyancy regulator 6 can be cut to have an opening instead of the water injection/drainage pipe 7.

The gas inhaling/expelling pipe 8 connects the interior of the buoyancy regulator 6 with air, the length of which should be long enough to have its end protruded above the water level while installing the separation passageway apparatus 1 at the determined depth. In addition, the gas inhaling/expelling valve 9 is provided at the middle or at the end of the gas inhaling/expelling pipe 8 for opening/closing the gas inhaling/expelling pipe 8. The gas inhaling/expelling pipe 8 can be a metallic hard pipe or plastic flexible pipe.

The depth measuring staff is a long pillar with graduated scale for measuring depth, the length of which should be long enough to have its end protruded above the water level while installing the separation passageway apparatus 1 at the determined depth. By reading the scale of the depth measuring staff 10 at the water level, the installation depth of the separation passageway apparatus 1 is known. Besides, by reading the scale difference of the two depth measuring staff 10 provided on the left and right sides, the tilting angle of the separation passageway apparatus 1 on the left and right directions is thus known.

Although the two depth measuring staff 10 are provided on the left and right sides in this example, the tilting angle of the separation passageway apparatus 1 on the front and rear directions can be known if the two depth measuring staff 10 are provided on the front and rear sides.

The steps for installing the separation passageway apparatus 1 on the suspension separation tank are described in the following.

<1> The separation passageway apparatus 1 is lifted above the water level of the suspension separation tank by crane. At the time, the interior of the buoyancy regulator 6 is empty (only with air and without any water) and the gas inhaling/expelling valve 9 is close.

<2> Let the separation passageway apparatus 1 float on the suspension separation tank. Water flows into the buoyancy regulator 6 via the water injection/drainage pipe 7 if the gas inhaling/expelling valve 9 is open. When water flows into the buoyancy regulator 6, the separation passageway apparatus 1 loses buoyant force and starts to sink.

<3> As the separation passageway apparatus 1 starts to sink, the gas inhaling/expelling valve 9 is close. At present, gravity of the separation passageway apparatus 1 is only slightly larger than buoyant force. Therefore, if descending to the desired depth, the separation passageway apparatus 1 should be hung by ropes to maintain at this depth. The tension on the ropes equals to the difference between gravity and buoyant force of the separation passageway apparatus 1 and thus is very small. Therefore, the ropes can be small-diameter fiber ropes. In general, the smaller difference between gravity and buoyant force of the separation passageway apparatus 1 is better. However, if the difference is zero, the separation passageway apparatus 1 becomes unstable if there is external disturbance. Thus, it should be adjusted so that gravity is slightly larger than buoyant force (about 1 kg, or several kgs).

When the separation passageway apparatus 1 is uninstalled from the suspension separation tank, a high pressure air source is connected to the water injection/drainage pipe 7 and the gas inhaling/expelling valve 9 is open to let air flow into the buoyancy regulator 6 to drain water out of the buoyancy regulator 6 so as to let the separation passageway apparatus 1 float up. Although the high pressure air source can be a high pressure air supply apparatus mounted at the peripheral of the suspension separation tank or a portable air compressor, the depth of water in the suspension separation tank is only about 2 or 3 meters so that the apparatus with such high pressure is not needed. Therefore, a manual air pump or pedal bellow can be used to inject air into the buoyancy regulator 6.

Figure 3:
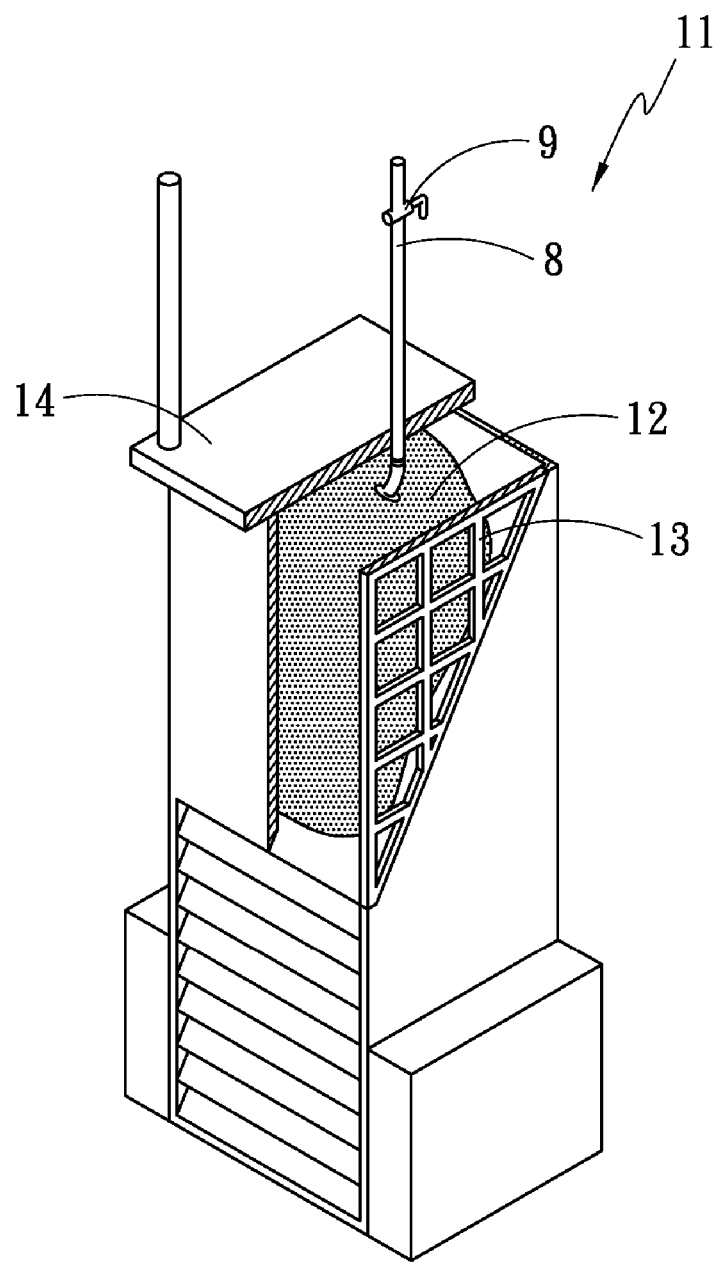
FIG. 3 is a side view of the separation passageway apparatus for other examples.

FIG. 3 is a side view of the separation passageway apparatus for other examples with different structures. As shown in FIG. 3, the characteristic of a separation passageway apparatus 11 comprises a gasbag 12 functioning as the buoyancy regulator 6 in the separation passageway apparatus 1. The gasbag 12 is made of rubber and is a bag-type object. The gas inhaling/expelling pipe 8 and the gas inhaling/expelling valve 9 are connected to the gasbag 12. When connecting the gas inhaling/expelling pipe 8 to a high pressure air source, not shown in the figure, and opening the gas inhaling/expelling valve 9, high pressure air is injected. If the high pressure air source is removed from the gas inhaling/expelling pipe 8 and the gas inhaling/expelling valve 9 is open, high pressure air is expelled.

Besides, the gasbag 12 is provided in a grid-shape framework 13 on the upper portion of the separation passageway apparatus 11 and the top of the framework 13 is covered by a covering plate 14. The framework 13 is designed to be a grid shape in order to reduce its weight. The covering plate 14 is provided for preventing the gasbag 12 from being solarized so as to control surface deterioration of the gasbag 12 and growth and adhesion of germs on the surface of the gasbag 12.

Figure 4:
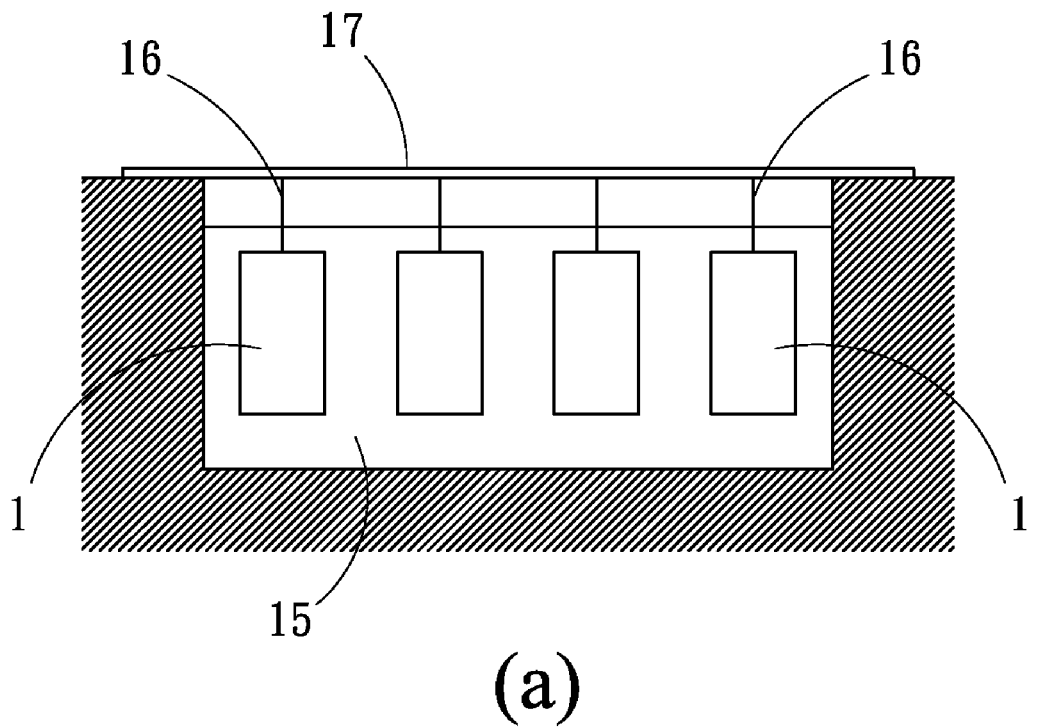
FIG. 4 is a schematic diagram illustrating the relative position of the separation passageway apparatus to the suspension separation tank.
Figure 4:
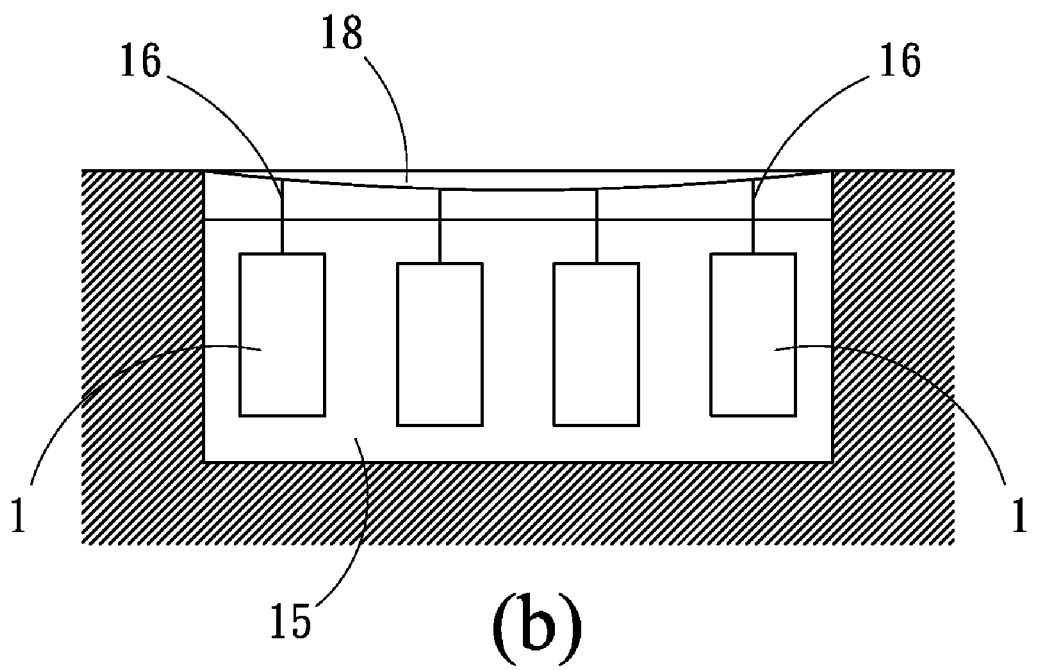

FIG. 4 is a schematic diagram illustrating installation of the separation passageway apparatus 1 at the bottom of the suspension separation tank 15. The weight of the separation passageway apparatus 1 is slightly larger than buoyant force and thus the tension of the rope 16 to lift up the separation passageway apparatus 1 is very small. Therefore, as shown in FIG. 4, several separation passageway apparatuses 1 are hung on a light-weighted bar 17 (steel tube or structural steel) provided across the suspension separation tank 15. Or, the separation passageway apparatuses 1 are hung on a rope 18 provided across the suspension separation tank 15. Thus, the separation passageway apparatus 1 can be installed by a simple and light-weighted supporting object or hanging method. The ropes 16 and 18 have to be corrosion-resistant by the suspension and have enough strength. Fiber ropes, steel ropes, or other ropes made of other materials can be selected.

EXAMPLE 2

Figure 5:
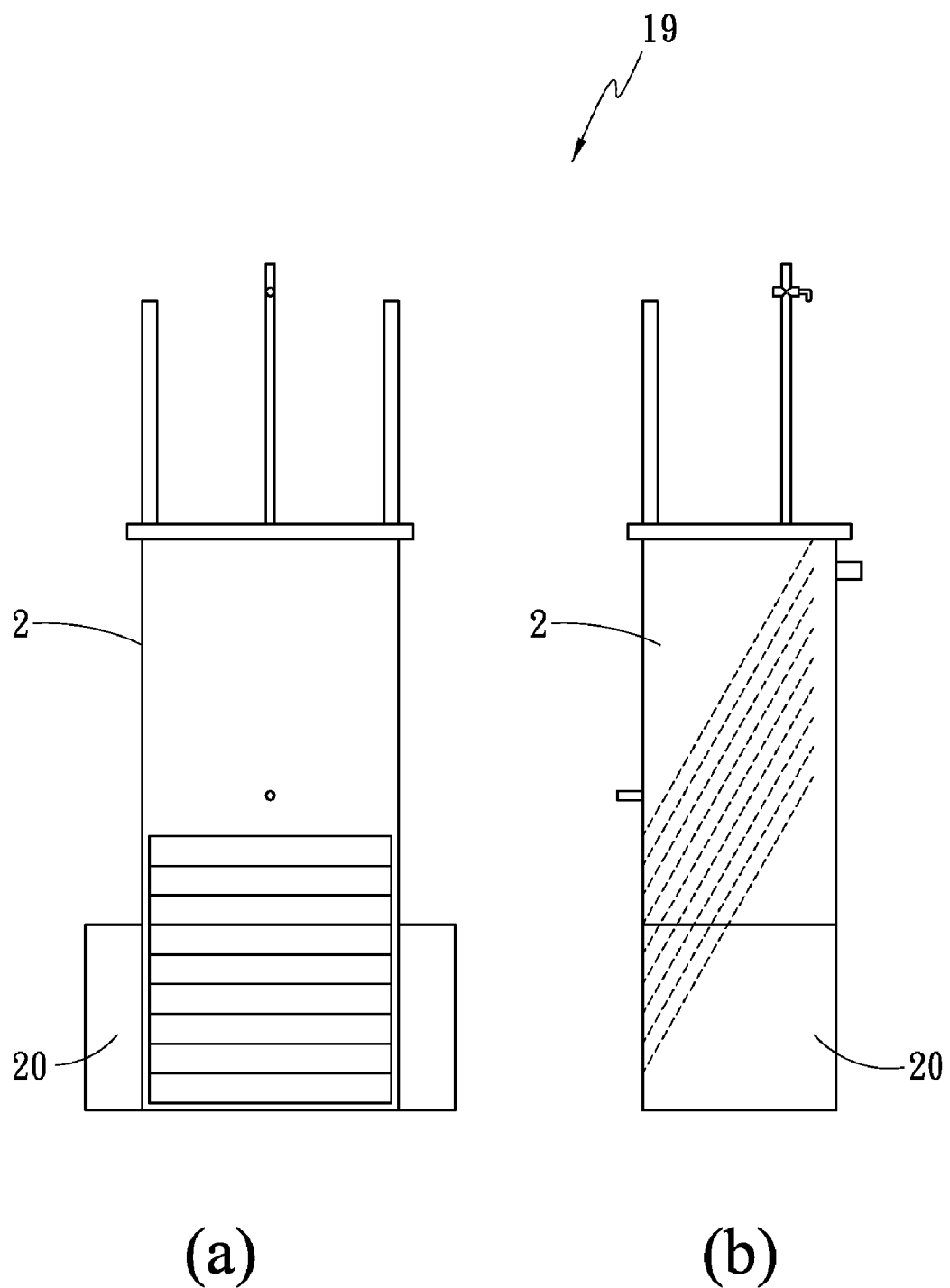
FIG. 5 is a front view and a side view of the separation passageway apparatus according to example 2 of the present invention.

FIG. 5 is a front view (a) and a side view (b) of the separation passageway apparatus according to example 2 of the present invention. As shown in FIG. 5, the characteristic of the separation passageway apparatus 19 comprises auxiliary buoyancy balance regulators 20 at the two sides of the lower portion of the casing 2. The rest of the structure of the separation passageway apparatus 19 is the same as that of the separation passageway apparatus 1. Thus, the description of the rest structure is omitted herein.

The working principle of the auxiliary buoyancy balance regulator 20 is the same as the buoyancy regulator 6, i.e. adjusting buoyant force of the ballast tank is done by increasing/decreasing the amount of water and air therein. The two auxiliary buoyancy balance regulators 20 at the left and right sides each comprise a liquid injection/drainage means for independently injecting/draining water. Therefore, by increasing/decreasing buoyant force of the two auxiliary buoyancy balance regulators 20 at the left and right sides, the left/right tilting angle of the separation passageway apparatus 19 can be adjusted.

In addition, by providing the two auxiliary buoyancy balance regulators 20 at the front and rear sides of the casing 2, the separation passageway module can be shaken to the front or the rear so as to discharge flocculation piling up on the inclined passageway 3.

Figure 6:
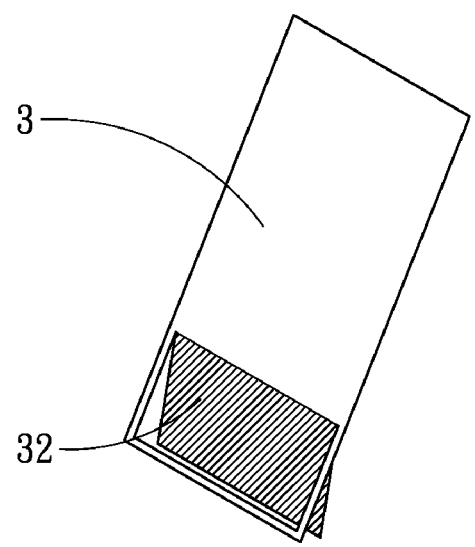
FIG. 6 is side views of the structure of the inclined plates.
Figure 6:
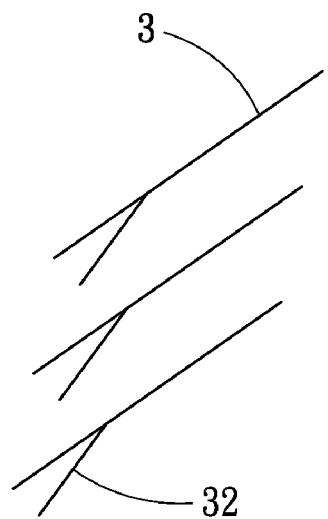

FIG. 6 is a schematic diagram illustrating another type of inclined plates 3 according to example 2 of the present invention. As shown in FIG. 6(a), a gravity gate 32 is provided at the front end of the inclined plate 3 for discharging settling sludge. When sludge piles up on the inclined plate till certain amount, the gravity gate 32 is open due to gravity of the settling sludge. Referring to FIG. 6(b), the gravity gate 32 can be open no more than half height between adjacent inclined plates, so that the gravity gate 32 not only has function of discharging settling sludge but also keeps the separation passageway from being blocked. On the other hand, in order for the settling sludge to gradually fall off, the inclined plates 3 are staggered to each other, the design of which is to decrease the distance between the inclined plate 3 and the front side plate as the distance between the inclined plate 3 and the top plate increases.

EXAMPLE 3

Figure 7:
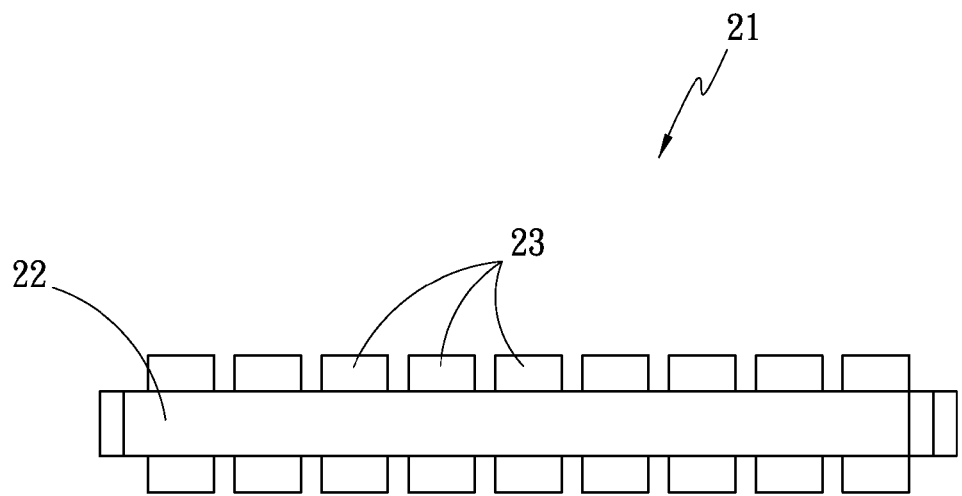
FIG. 7 is a plan view of the suspension separation unit according to example 3 of the present invention.

FIG. 7 is a plan view of the suspension separation unit for according to example 3 of the present invention. As shown in FIG. 7, a suspension separation unit 21 comprises a plurality of separation passageway modules 23 provided at two sides of a conduit 22. The suspension separation unit floats on the suspension separation tank and is tied up with an appropriate method.

The conduit 22 has two functionalities. One is as a storage container for storing the clear liquid generated by the separation passageway modules 23 and the other is as a floating body for generating buoyant force to support the weight of the suspension separation unit 21.

Figure 8:
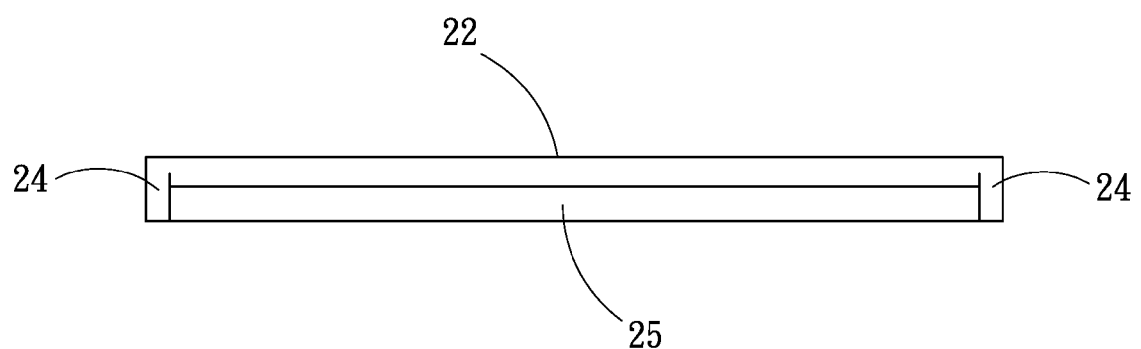
FIG. 8 is a vertical sectional view of a conduit.

FIG. 8 is a vertical sectional view of the conduit 22. Drainage apparatuses 24 are provided at the front and rear ends of the conduit 22 and can temporarily store clear water. The clear water from the separation passageway modules 23 flowing in the conduit 22 remains in the drainage apparatuses 24 until drained by a drainage apparatus (not shown) for next process. On the other hand, a watertight space 25 is provided at the lower portion of the conduit 22 for providing buoyant force. Thus, even when the conduit 22 is filled with clear water, the separation passageway module 23 does not sink.

Figure 9:
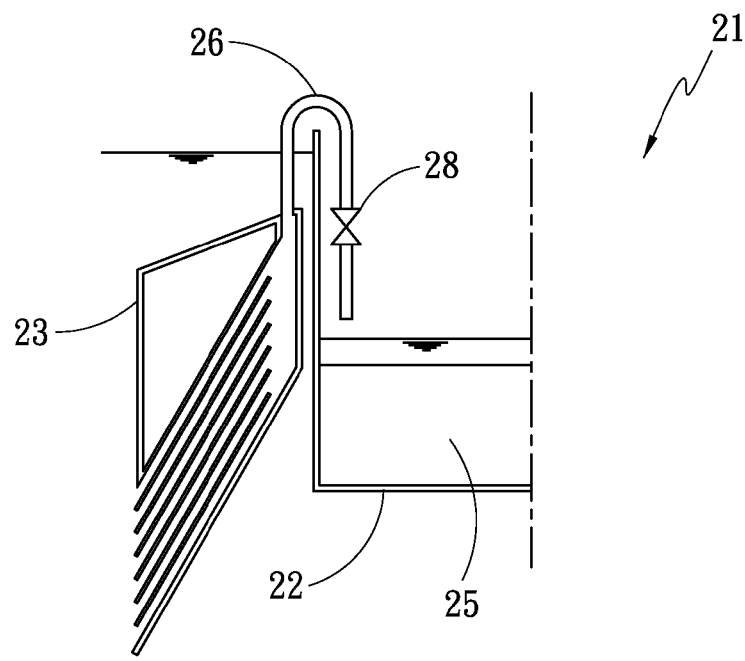
FIG. 9 is a horizontal sectional view of the separation passageway module.
Figure 9:
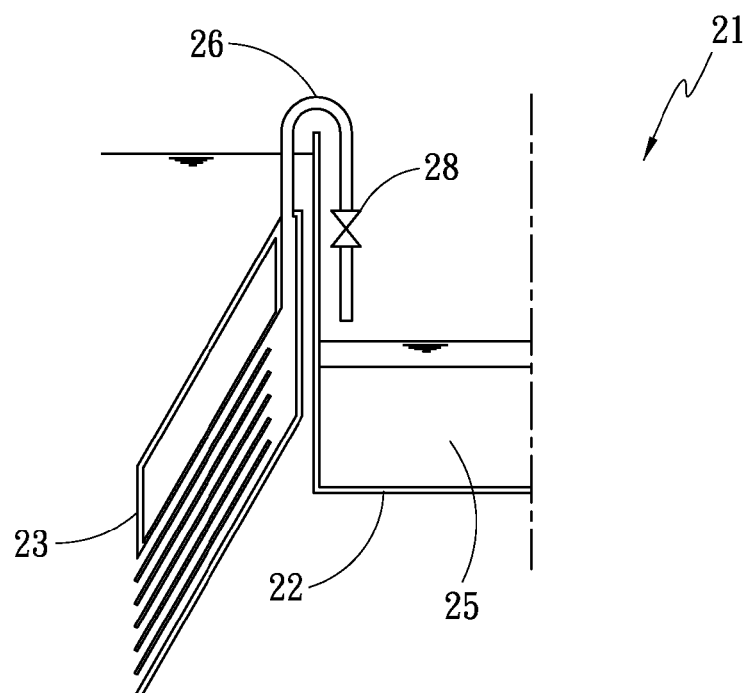

FIG. 9 is a horizontal sectional view of the separation passageway module 23. As shown in FIG. 9(a), the top plate of the separation passageway module 23 is inclined low in the front and high in the rear to prevent sludge from settling on the top surface of the module because sludge slides along the inclined surface to fall down so as to reduce loading on the module. Besides, as shown in FIG. 9(b), the inclined level of the top plate is increased so that the top plate is parallel to the inclined plates so as to further lower the possibility of settling sludge. In a preferred case of this example, the rest of the structure of the separation passageway module 23 is the same as that of the separation passageway apparatus 1. Thus, the description of the rest structure is omitted herein.

Figure 10:
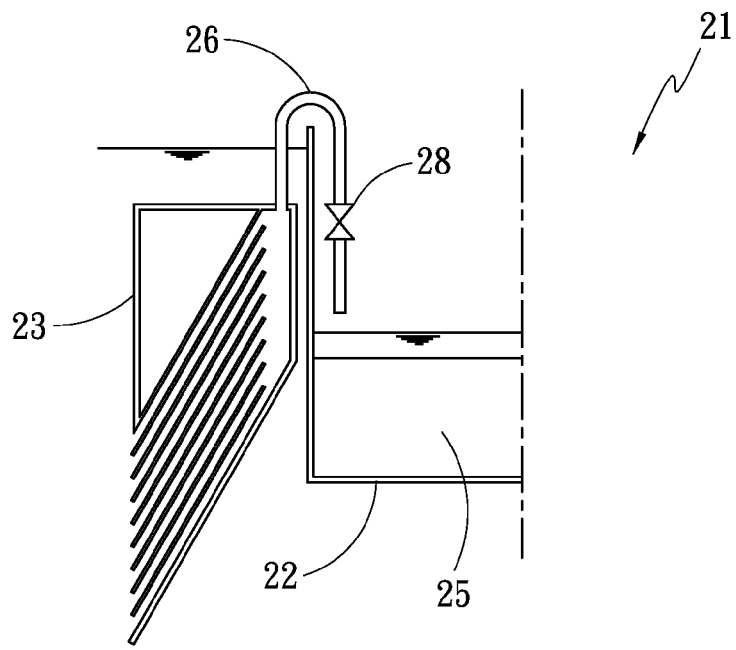
FIG. 10 is a horizontal sectional view of the suspension separation unit.
Figure 10:
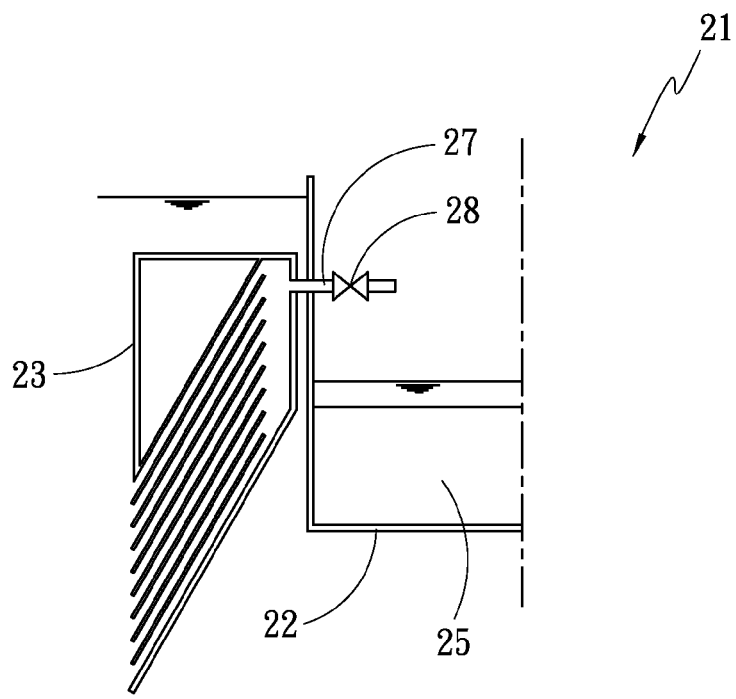

FIG. 10 is a horizontal sectional view of the suspension separation unit 21. Sending the clear water generated in the separation passageway modules 23 to the conduit 22 can be a method using a siphon 26, shown in FIG. 10(a), or a method using a siphon 27 penetrating the side wall of the conduit 22 [as shown in FIG. 10(b)]. A valve 28 is for adjusting the amount of clear water to send out. To connect the conduit 22 and the separation passageway module 23 can be a method using welding or riveting (not shown in FIG. 10). Or, a bolt/nut connection method (not shown in FIG. 10) can be used so that they can be easily maintained or replaced if some part of the separation passageway module 23 is damaged.

EXAMPLE 4

Figure 11:
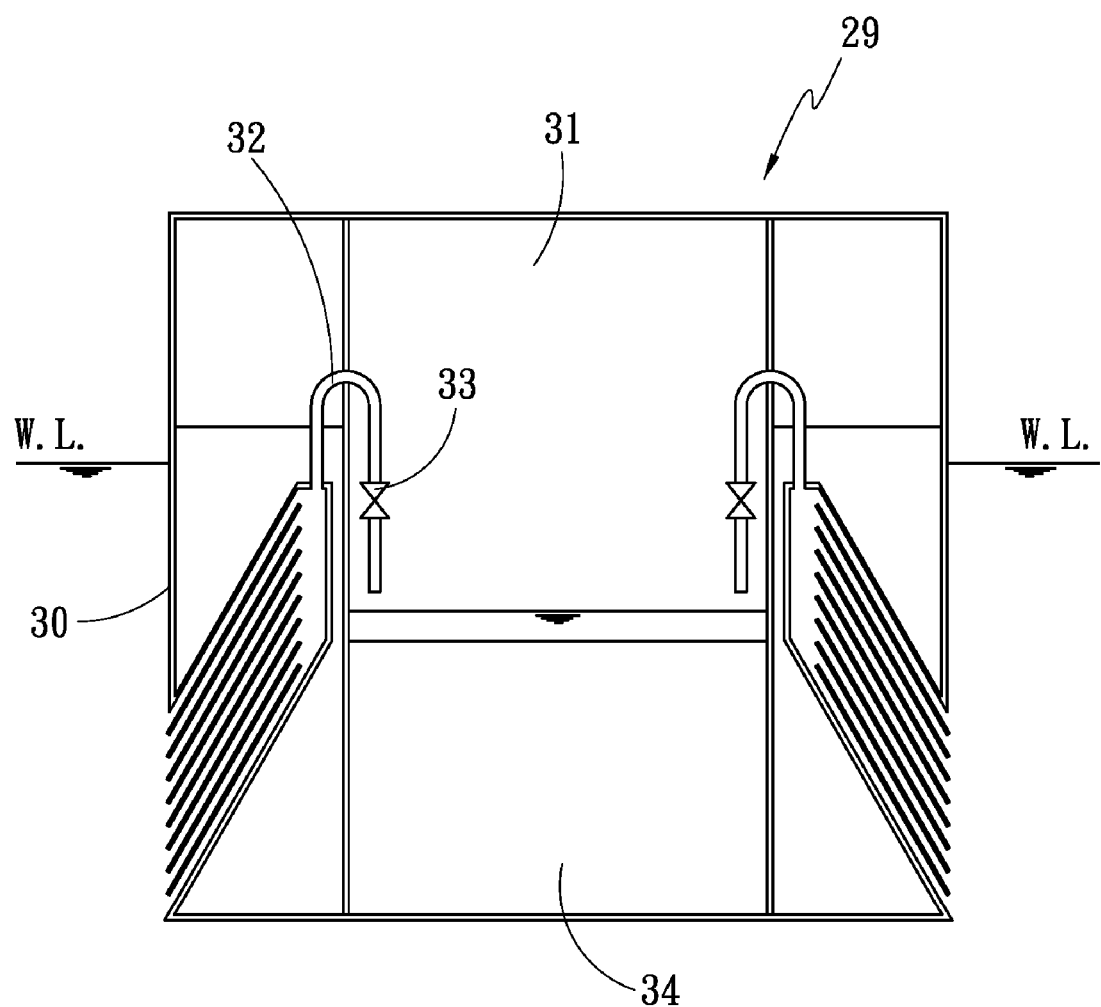
FIG. 11 is a horizontal sectional view of the suspension separation boat.

FIG. 11 is a horizontal sectional view of the suspension separation boat according to example 4 of the present invention. A suspension separation boat 29 is fabricated by integrating the conduit 22 and the separation passageway module 23 of the suspension separation unit 22 into a one-piece-formed boat. Separation passageway modules 30 are provided at the left and right sides of the boat. A storage tank 31 is at the center portion of the boat for storing clear water generated by the separation passageway modules 30. A siphon 32 sends the clear water from the separation passageway modules 30 to the storage tank 31. A valve 33 is for adjusting the amount of clear water to send out. A space 34 is watertight for providing buoyant force. Thus, even when the storage tank 31 is filled with clear water, the suspension separation boat 29 does not sink. The storage tank is not necessary to be a six-facet sealed object and can be a top-opened object.

The suspension separation boat 29 is made for the following objectives. The boat sails in river of the adversity area where the water supply equipment is damaged to generate clear water from the river and to thereby provide drinking water with a sterilization method (not shown). The boat can be tied at the river front to continuously take out clear water from the tank 31. On the other hand, the boat can generate clear water to fill up the tank 31 at the place that is suitable to draw water and then move to the place that needs water supply to unload the clear water.

A lift pump for unload the clear water from tank 31 can be installed on the suspension separation boat 29 or on shore. Besides, the suspension separation boat 29 further comprises a sterilization apparatus to function like a water treatment plant.

Thus, the suspension separation boat 29 is either a self-propelled boat or not a self-propelled boat, i.e. a boat with propellers or a barge that can be towed by a towboat.

To sum up, the present invention discloses a separation passageway module comprising a plurality of inclined plates, at least one suction pipe, and a buoyancy regulator. The inclined plate passageways are comprised by a plurality of inclined parallel plates. The inclined plate passageways have an opening at either the lower end or the upper end. In the case of having an opening at the lower end, suspension flows into the inclined plate passageways from the lower end to carry out settling separation and to thereby generate clear liquid at the upper end of the inclined plate passageways. On the other hand, in the case of having an opening at the upper end, suspension flows into the inclined plate passageways from the upper end to carry out floating separation and to thereby generate clear liquid at the lower end of the inclined plate passageways. One end of the suction pipe is connected to the upper end or lower end of the inclined plate passageways for drawing the clear liquid. The buoyancy regulator adjusts the buoyant force of the separation passageway module so as to make the buoyant force and the gravity of the separation passageway module reach a specific relationship. Furthermore, the present invention discloses the structures of a suspension separation unit and a suspension separation boat.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A separation passageway module for suspension separation, comprising:

a plurality of inclined plate passageways comprised by a plurality of inclined parallel plates wherein said inclined plate passageways have an opening at the lower end, suspension flows into said inclined plate passageways from the lower end to carry out settling separation and to thereby generate clear liquid at the upper end of said inclined plate passageways;

at least one suction pipe, one end which is connected to the upper end of said inclined plate passageways for drawing said clear liquid; and, a buoyancy regulator for adjusting buoyant force of the separation passageway module, said buoyancy regulator comprises a ballast tank, a liquid injection/drainage opening provided underneath said ballast tank, a gas inhaling/expelling pipe connected to the upper portion of said ballast tank, and a gas inhaling/expelling valve provided on said gas inhaling/expelling pipe, so as to make buoyant force and gravity of the separation passageway module have a specific relationship.

2. The module according to claim 1, wherein said buoyancy regulator is provided on the top of the plurality of inclined plate passageways.

3. The module according to claim 1, wherein gravity of the separation passageway module is larger than buoyant force of the separation passageway module and the difference between them is greater than 1 kg.

4. A separation passageway apparatus, comprising:

a casing comprising a top plate, a bottom plate, two front and rear side plates, and two parallel left and right side plates wherein said front side plate is perpendicular to said left and right side plates and the lower end of said front side plate has an opening region as an inlet for suspension;

a plurality of inclined plates parallel to each other and provided low in the front and high in the rear between said left and right side plates wherein the front end of said inclined plates is connected to said opening region to guide suspension to flow in and carry out settling separation so as to generate clear liquid at the rear end of said inclined plates;

a storage region for storing clear liquid, provided at the rear end of said inclined plates and between said left and right side plates and said rear side plate;

a suction pipe, one end of which is connected to said storage region for drawing out said clear liquid; and, a buoyancy regulator provided between said top plate, said front side plate, said left and right side plates, and said inclined plate that is closest to said top plate wherein said buoyancy regulator adjusts buoyant force of the separation passageway apparatus, so as to make buoyant force and gravity of the separation passageway apparatus have a specific relationship.

5. The apparatus according to claim 4, wherein the distance between said inclined plate and said front side plate increases along with the decrease of the distance between said inclined plate and said top plate.

6. The apparatus according to claim 5, wherein the front end of said inclined plates comprises at least one gravity gate for discharging settling sludge.

7. The apparatus according to claim 4, wherein said buoyancy regulator is an elastic gas container, comprising:

a gasbag;

a gas inhaling/expelling pipe connected to said gasbag; and a gas inhaling/expelling valve provided on said gas inhaling/expelling pipe.

8. The apparatus according to claim 4, wherein said buoyancy regulator comprises a ballast tank for injecting or draining liquid.

9. The apparatus according to claim 8, wherein said buoyancy regulator further comprises a liquid injection/drainage opening provided underneath said ballast tank, a gas inhaling/expelling pipe connected to the upper portion of said ballast tank, and a gas inhaling/expelling valve provided on said gas inhaling/expelling pipe.

10. The apparatus according to claim 4, further comprising: a plurality of buoyancy balance regulators each independently increasing or decreasing buoyant force.

11. The apparatus according to claim 10, wherein the plurality of buoyancy balance regulators are two buoyancy balance regulators provided at the outer side of said left and right side plates, separately.

12. The apparatus according to claim 10, wherein the plurality of buoyancy balance regulators are two buoyancy balance regulators provided at the outer side of said front and rear side plates, separately.

13. The apparatus according to claim 4, wherein said top plate is provided inclined low in the front and high in the rear.

14. The apparatus according to claim 4, wherein said top plate is provided parallel to said inclined plates.

15. The apparatus according to claim 4, further comprising at least one staff provided on the top of said top plate for measuring installation depth of the apparatus.

16. A separation unit for suspension separation capable of floating on the surface of the suspension, said separation unit comprising:

a conduit having at least one watertight space; and a plurality of separation passageway modules mounted on the two sides of said conduit, wherein each separation passageway module comprises:

a plurality of inclined parallel plates comprising a plurality of inclined plate passageways wherein said inclined plate passageways have an opening at the lower end, suspension flows into said inclined plate passageway from the lower end to carry out settling separation and thereby generate clear liquid at the upper end of said inclined plate passageway;

at least one suction pipe, one end of which is connected to the upper end of said inclined plate passageway for drawing said clear liquid; and, a buoyancy regulator for adjusting buoyant force of the separation passageway module, said buoyancy regulator comprises a ballast tank, a liquid injection/drainage opening provided underneath said ballast tank, a gas inhaling/expelling pipe connected to the upper portion of said ballast tank, and a gas inhaling/expelling valve provided on said gas inhaling/expelling pipe, so as to make buoyant force and gravity of the separation passageway module have a specific relationship.

17. The separation unit according to claim 16, wherein said buoyancy regulator is provided on the top of the plurality of inclined plate passageways.

18. The separation unit according to claim 16, wherein gravity of the separation passageway module is larger than buoyant force of the separation passageway module and the difference between them is greater than 1 kg.

19. A separation boat for suspension separation, capable of floating on the liquid level of the suspension to carry out settling separation to generate clear liquid, said separation boat comprising:

a plurality of liquid inlets provided below the waterline of the boat at the lower shipboard;

at least one storage tank;

at least one watertight space provided at the lower portion of said storage tank; and, a plurality of separation passageway modules mounted on the two sides of said storage tank;

wherein each separation passageway module comprises:

a plurality of inclined plate passageways comprised by a plurality of inclined parallel plates wherein said inclined plate passageways have an opening at the lower end and suspension flows into said inclined plate passageways from the lower end to carry out settling separation and thereby generate clear liquid at the upper end of said inclined plate passageway;

at least one suction pipe, one end of which is connected to the upper end of said inclined plate passageway for drawing said clear liquid; and, a buoyancy regulator for adjusting buoyant force of the separation passageway module, said buoyancy regulator comprises a ballast tank, a liquid injection/drainage opening provided underneath said ballast tank, a gas inhaling/expelling pipe connected to the upper portion of said ballast tank, and a gas inhaling/expelling valve provided on said gas inhaling/expelling pipe, so as to make buoyant force and gravity of the separation passageway module have a specific relationship.

20. The separation unit according to claim 19, wherein said buoyancy regulator is provided on the top of the plurality of inclined plate passageways.

21. The separation unit according to claim 19, wherein gravity of the separation passageway module is larger than buoyant force of the separation passageway module and the difference between them is greater than 1 kg.

* * * * *